(12) United States Patent  
Larsson (10) Patent No.: US 8,268,275 B2  
(45) Date of Patent: Sep. 18, 2012

(54) METHOD AND DEVICE FOR CONTROLLING THE SUPPLY OF A REDUCING AGENT TO AN SCR SYSTEM

(75) Inventor: Mikael Larsson, Molndal (SE)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 13/060,933

(22) PCT Filed: Aug. 31, 2009

(86) PCT No.: PCT/EP2009/061179
§ 371 (c)(1),
(2), (4) Date: Feb. 25, 2011

(87) PCT Pub. No.: WO2010/026120
PCT Pub. Date: Mar. 11, 2010

(65) Prior Publication Data
US 2011/0150732 A1    Jun. 23, 2011

(30) Foreign Application Priority Data
Sep. 4, 2008  (EP) ..................................... 08163635

(51) Int. Cl.
*B01D 53/56* (2006.01)
*B01D 53/79* (2006.01)
(52) U.S. Cl. ............... 423/239.1; 423/DIG. 5; 422/105; 422/110; 422/111; 422/168
(58) Field of Classification Search ............... 423/239.1, 423/DIG. 5; 422/168, 105, 110, 111
See application file for complete search history.

(56) References Cited

U.S. PATENT DOCUMENTS

| 5,585,072 A | 12/1996 | Moskal et al. |
| 5,676,071 A | 10/1997 | Horler et al. |
| 8,178,460 B2 * | 5/2012 | Norton et al. ................... 502/20 |
| 2003/0003029 A1 | 1/2003 | Rogers et al. |

FOREIGN PATENT DOCUMENTS

| DE | 3740675 | 6/1989 |
| JP | 53014667 | 2/1978 |
| WO | WO 97/09112 | 3/1997 |

OTHER PUBLICATIONS

PCT International Search Report and The Written Opinion of the International Searching Authority dated Aug. 31, 2009—(PCT/EP2009/061179).

* cited by examiner

*Primary Examiner* — Timothy Vanoy
(74) *Attorney, Agent, or Firm* — Rita D. Vacca (57) ABSTRACT

A selective catalytic reduction reactor (8), which comprises at least one catalyst layer (14), is operative for removing NOx from a flow of process gas of a process plant, such as a combustion plant or an incineration plant. A device for controlling the feeding of a reducing agent, such as urea or ammonia, to said at least one catalyst layer (14), which has an attack area (A) facing the flow (P) of process gas, comprises at least one supply nozzle (32) which is operative for supplying reducing agent in at least one supply area (34) which corresponds to a part of the attack area (A), and a moving device (36) which is operative for moving said supply area (34) over the attack area (A).

12 Claims, 6 Drawing Sheets

Fig. 1

Inlet NOx profile

*Fig. 2a*

Outlet NOx profile, Prior art

Outlet NOx profile

METHOD AND DEVICE FOR CONTROLLING THE SUPPLY OF A REDUCING AGENT TO AN SCR SYSTEM

FIELD OF THE INVENTION

The present invention relates to a method of controlling the feeding of a reducing agent, such as urea or ammonia, to a selective catalytic reduction reactor which comprises at least one catalyst layer and which is operative for removing NOx from a flow of process gas of a process plant, such as a combustion plant or an incineration plant.

The present invention further relates to a device for controlling the feeding of a reducing agent, such as urea or ammonia, to a selective catalytic reduction reactor which is operative for removing NOx from a process gas of a process plant.

BACKGROUND OF THE INVENTION

In the combustion of a fuel, such as coal, oil, natural gas, peat, waste, etc., in a combustion plant, such as a power plant or a waste incineration plant, a process gas is generated. For separating nitrogen oxides, usually denoted NOx, from such a process gas, often referred to as a flue gas, a method is frequently used, in which a reducing agent, usually ammonia or urea, is mixed with the flue gas. The flue gas, mixed with said ammonia or urea, is then passed through a catalyst in which the reducing agent reacts selectively with the NOx to form nitrogen gas and water vapour. Usually the catalyst is installed in a so called Selective Catalytic Reduction reactor (SCR reactor).

In many processes, the concentration of NOx of the flue gas is not evenly distributed over the cross-section of the SCR reactor. This poses a problem, since a stoichiometric ratio between the NOx and the reducing agent is essential for achieving a good reduction of the NOx content of the flue gas and a low slip of the reducing agent from the SCR reactor.

U.S. Pat. No. 6,905,658 discloses an SCR reactor in which a gas flow is divided into several separate flow channels upstream of the catalytic material. Each flow channel is provided with a separate means for supplying ammonia to that specific flow channel. By individually adjusting each of said separate means for supplying ammonia it becomes possible to achieve a close to stoichiometric ratio between the NOx and the ammonia.

A problem of U.S. Pat. No. 6,905,658 is that a large number of separate means for supplying ammonia that are individually controllable increases the cost of the SCR reactor.

SUMMARY OF THE INVENTION

An object of the present invention is to provide a method of controlling the supply of a reducing agent, such as ammonia or urea, to an SCR reactor, which method is efficient in handling uneven NOx profiles.

This object is achieved by means of a method of controlling the feeding of a reducing agent, such as urea or ammonia, to a selective catalytic reduction reactor which comprises at least one catalyst layer and which is operative for removing NOx from a flow of process gas of a process plant, such as a combustion plant or an incineration plant, said at least one catalyst layer having an attack area facing the flow of process gas, said method being characterised in supplying, in at least one supply area which corresponds to a part of the attack area, at least a portion of said reducing agent to said at least one catalyst layer, and moving said supply area over the attack area.

An advantage of this method is that it provides for supplying the reducing agent in those locations of the attack area where it is best needed. Thus, the reduction of NOx in the selective catalytic (SCR) reactor can be increased, without increasing the slip of the reducing agent.

According to one embodiment the amount of reducing agent supplied to said supply area is varied, as the supply area is moved over the attack area, in view of a NOx profile indicating the concentrations of NOx at various points on the attack area. An advantage of this embodiment is that an uneven profile in the NOx concentration of the flow of process gas entering the SCR reactor can be compensated for by means of supplying more of the reducing agent in those locations on the attack area where the NOx concentration is higher than average, and supplying less of the reducing agent in those locations on the attack area where the NOx concentration is lower than average, thus utilizing the reducing agent in the most efficient manner.

According to one embodiment said NOx profile is updated on a regular basis, based on NOx measurements performed upstream and/or downstream of the catalyst layer. An advantage of this embodiment is that changes in the NOx profile, such changes being caused by, for example, a change in the load on the boiler, a change in the fuel quality, a change in the status of the burners of the boiler, etc., can be accounted for in the control of the supply of the reducing agent, such that efficient NOx removal can be ensured at all times.

According to one embodiment the amount of reducing agent supplied to said supply area is varied, as the supply area is moved over the attack area, in view of a reducing agent slip profile indicating the concentrations of the reducing agent at various points downstream of the catalyst layer. Varying the amount of reducing agent, such as ammonia, supplied to the supply area in view of the profile of reducing agent slip, e.g., the ammonia slip, increases the accuracy of the control, and reduces the slip of reducing agent from the catalyst layer.

According to one embodiment said method further comprises supplying a first portion of the reducing agent via a fixed reducing agent supply device, and supplying a second portion of said reducing agent in said at least one supply area being moved over said attack area. An advantage of this embodiment is that a base amount, i.e., said first portion, of reducing agent may continuously, or semi-continuously, be supplied by means of the fixed reducing agent supply device. This ensures an efficient removal of a substantial portion of the NOx. The second portion being supplied to the supply area being moved over the attack area can be used for fine-tuning the NOx removal to obtain a very efficient NOx removal.

According to a further embodiment said first portion corresponds to 60-95%, and said second portion corresponds to 5-40% of a total amount of the reducing agent being supplied to said at least one catalyst layer.

According to a preferred embodiment said supply area corresponds to 1-25% of said attack area. A supply area corresponding to less than 1% of the attack area would mean that each position on the attack area is scanned by the supply area rather seldom, which requires a very large storage capacity for the reducing agent of the catalyst layer, and decreases the possibility to respond quickly to changes in NOx load and NOx profile. A supply area corresponding to more than 25% of the attack area would mean that a very large portion of the attack area is supplied with reducing agent at each specific instance, which reduces the possibilities of fine-tuning the amount of reducing agent supplied at different locations on the attack area in view of, e.g., an uneven NOx profile.

According to one preferred embodiment said supply area is moved over the attack area in such a manner that the supply area is scanned over substantially the entire attack area in one cycle of moving said supply area. An advantage of this embodiment is that the risk that one portion of the attack area is left without any reducing agent is decreased.

A further object of the present invention is to provide a device by means of which the supply of a reducing agent, such as ammonia or urea, to an SCR reactor can be controlled in a manner which is capable of handling varying NOx profiles in the flow of process gas entering the SCR reactor.

This object is achieved through the use of a device for controlling the feeding of a reducing agent, such as urea or ammonia, to a selective catalytic reduction reactor which comprises at least one catalyst layer and which is operative for removing NOx from a flow of process gas of a process plant, such as a combustion plant or an incineration plant, said at least one catalyst layer having an attack area facing the flow of process gas, said device being characterised in comprising at least one supply nozzle which is operative for supplying reducing agent in at least one supply area which corresponds to a part of the attack area, and a moving device which is operative for moving said supply area over the attack area.

An advantage of this device is that it makes it possible to supply different amounts of reducing agent at different locations on the attack area.

Further objects and features of the present invention will be apparent from the description and the claims.

BRIEF DESCRIPTION OF THE DRAWINGS

The invention will now be described in more detail with reference to the appended drawings in which:

FIG. 4b is a schematic top view and illustrates an SCR reactor as seen in the direction of the arrow IVb of FIG. 4a.

DESCRIPTION OF PREFERRED EMBODIMENTS

Figure 1:
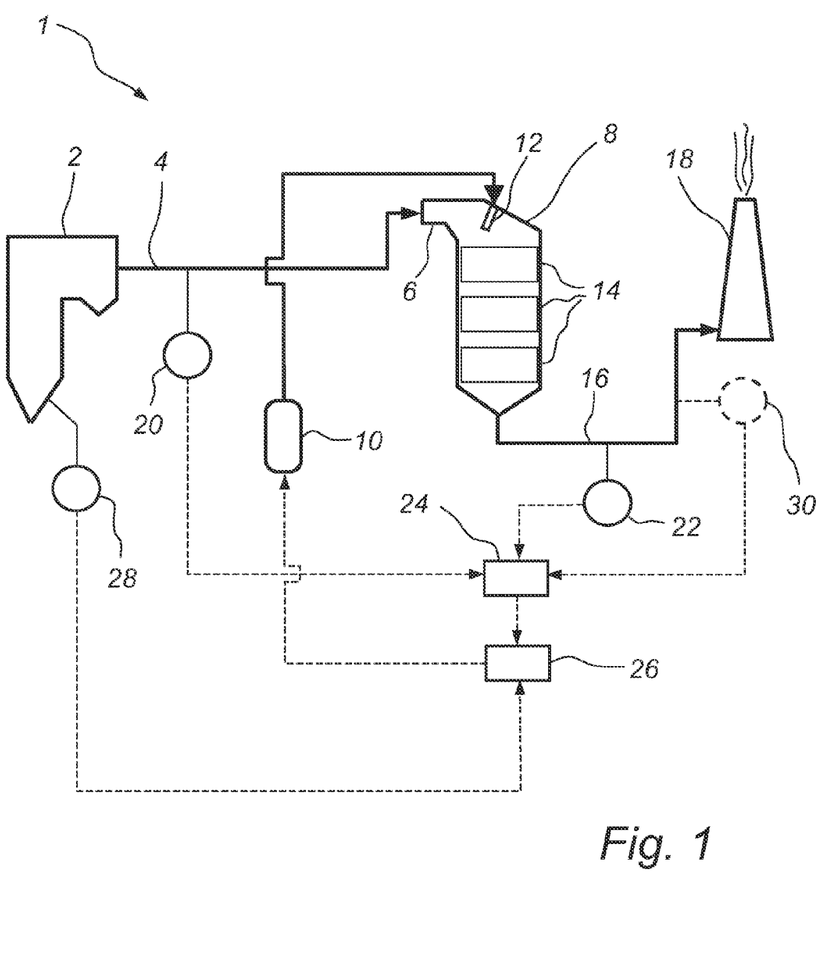
FIG. 1 is a schematic side view of a coal fired power plant.

FIG. 1 is a schematic side view illustration of a power plant 1. The power plant 1 comprises a coal fired boiler 2. In the coal fired boiler 2 coal is combusted in the presence of air, thereby generating a flow of a process gas in the form of a flue gas that leaves the coal fired boiler 2 via a duct 4. The duct 4 forwards the flue gas to an inlet 6 of a selective catalytic reduction (SCR) reactor 8. An ammonia supply system 10 is operative for supplying ammonia to an ammonia-injection system 12. The ammonia injection system 12 supplies gaseous ammonia, $NH_3$, to one or more consecutive layers 14 of SCR-catalyst located inside the SCR reactor 8. This SCR catalyst comprises a catalytically active component, such as vanadium pentoxide or wolfram trioxide, applied to a ceramic carrier material so as to comprise, e.g., a honeycomb structure or a plate structure. In the SCR reactor 8 the nitrogen oxides, NOx, in the flue gas react with the ammonia injected by means of the ammonia injection system 12 to form nitrogen gas, $N_2$. The flue gas then leaves the SCR-reactor 8 via a duct 16 and is emitted into the atmosphere via a stack 18. It will be appreciated that the power plant 1 may comprise further gas cleaning devices, such as particulate removers, such as electrostatic precipitators, and such as wet scrubbers. For reasons of maintaining clarity of illustration in the drawings such devices are not shown in FIG. 1.

A first NOx analyzer 20 is operative for measuring the amount of NOx in the duct 4, i.e., just after the boiler 2 and upstream of the SCR reactor 8. A second NOx analyzer 22 is operative for measuring the amount of NOx in the duct 16, i.e., downstream of the SCR reactor 8. A first controller 24 receives input from the first NOx analyzer 20 and the second NOx analyzer 22, as indicated in FIG. 1. Based on that input the first controller 24 calculates a present NOx removal efficiency. The calculated present NOx removal efficiency is compared to a NOx removal set point. This may be done by means of a PID-controller included in the first controller 24. The first controller 24 calculates, e.g. by means of said PID controller, a set point for the flow of ammonia, and sends information about such flow of ammonia to a second controller 26.

Optionally, a load sensor 28 is operative for sensing the load on the boiler 2. Such load could be expressed in terms of, for example, the amount of fuel, such as ton/h of coal, that is transported to the boiler 2. The load sensor 28 causes a signal to be sent to the second controller 26. This signal from the load sensor 28 indicates the load on the boiler 2, and is, since the boiler 2 is located upstream of the SCR reactor 8, a feed-forward signal indicating the load on the boiler 2, a load which will affect the SCR reactor 8 in the near future.

The second controller 26 may account for the load on the boiler 2, as measured by the load sensor 28, and adjusts, based on the load on the boiler 2, the set point for the flow of ammonia as calculated by the first controller 24. An adjusted set point for the flow of ammonia, which takes the load on the boiler 2 into account, is sent to the ammonia supply system 10, which then supplies ammonia to the ammonia injection system 12.

As an option, an ammonia slip analyzer 30 could be provided. The ammonia slip analyzer 30, as illustrated in FIG. 1, is designed to be operative for measuring the concentration of ammonia in the gas duct 16, i.e., downstream of the SCR reactor 8. The ammonia slip analyzer 30 causes a signal to be sent to the first controller 24. In response to its receiving such a signal, the first controller 24 may adjust the set point for the flow of ammonia for the purpose of avoiding too large an ammonia slip from the SCR reactor 8. The strategy for the first controller 24 can be selected to be one wherein the removal efficiency of NOx is maximized up to a certain maximum slip of ammonia, as the latter being measured by the ammonia slip analyzer 30. When the measured ammonia slip reaches a maximum ammonia slip value, as determined by the ammonia slip analyzer 30, the first controller 24 controls the set point for the flow of ammonia in such a manner that this maximum ammonia slip value is not exceeded. Other control strategies are also possible, for example the strategy of maintaining a certain outlet NOx amount, up to a certain slip of ammonia, the latter being measured by the ammonia slip analyzer 30.

Figure 2A:
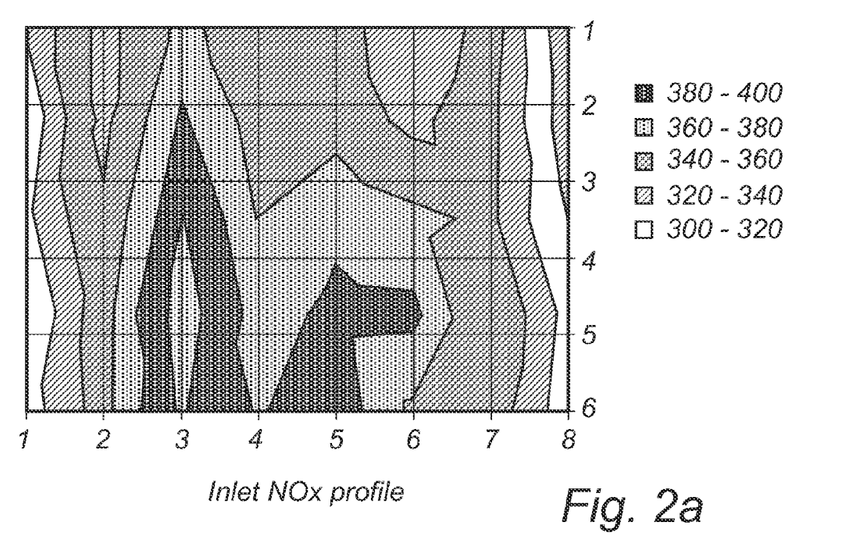
FIG. 2a is a diagram and illustrates an inlet NOx profile, as measured in various points located in a horizontal plane just upstream of a catalyst layer.

FIG. 2a illustrates how an inlet NOx profile, as measured in various points located in a horizontal plane at the inlet 6 of the SCR reactor 8, i.e. just upstream of the catalyst layers 14, is very uneven. Thus, the amount of NOx to be treated in one position of the SCR reactor 8 is very different from the amount of NOx to be treated in another position of the SCR reactor 8. In this case, the areas with the highest concentration of NOx have a concentration of about 390 mg of NOx per $Nm^3$ gas, wet basis. The areas with the lowest concentration of NOx have a concentration of about 320 mg of NOx per $Nm^3$ gas, wet basis.

Figure 2B:
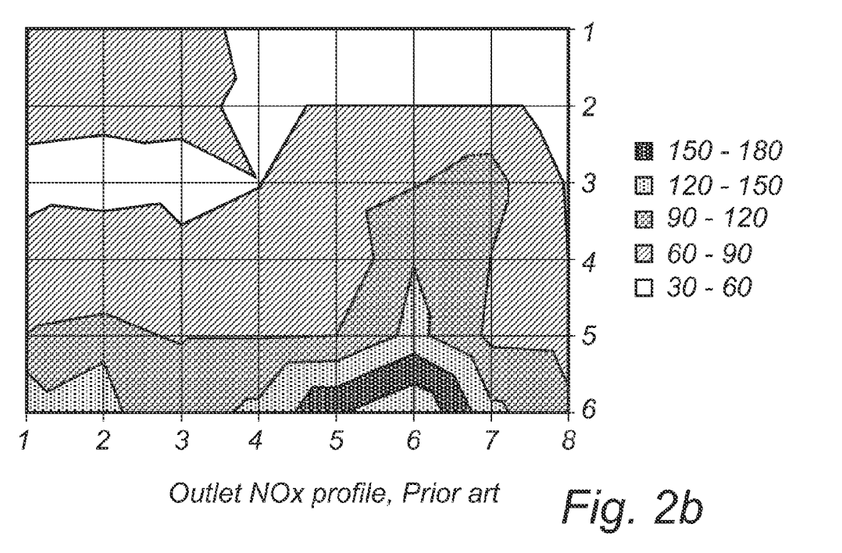
FIG. 2b is a diagram and illustrates an outlet NOx profile, as measured in various points located in a horizontal plane just downstream of a catalyst layer, when operating in accordance with a prior art method.

FIG. 2b illustrates an outlet NOx profile, as measured in various points located in a horizontal plane located just downstream of the catalyst layers 14, which would result from the inlet NOx profile of FIG. 2a when operating an SCR reactor in accordance with a prior art method. As can be seen from FIG. 2b, the outlet NOx profile is very uneven with concentrations varying from 50 mg of NOx per $Nm^3$ gas, wet basis, at the areas with the lowest concentration of NOx, up to about 170 mg of NOx per $Nm^3$ gas, wet basis, at the areas with the highest concentration of NOx. Typically, the average outlet concentration of NOx would be in the range of 100 mg of NOx per $Nm^3$ gas, wet basis. A problem with the situation illustrated in FIG. 2b is that any attempts to increase the removal of NOx by increasing the supply of ammonia would almost certainly cause an increased slip of excess ammonia, in particular in those areas where the outlet NOx concentration is the lowest and where there is not much NOx available for reacting with the extra ammonia.

Figure 3:
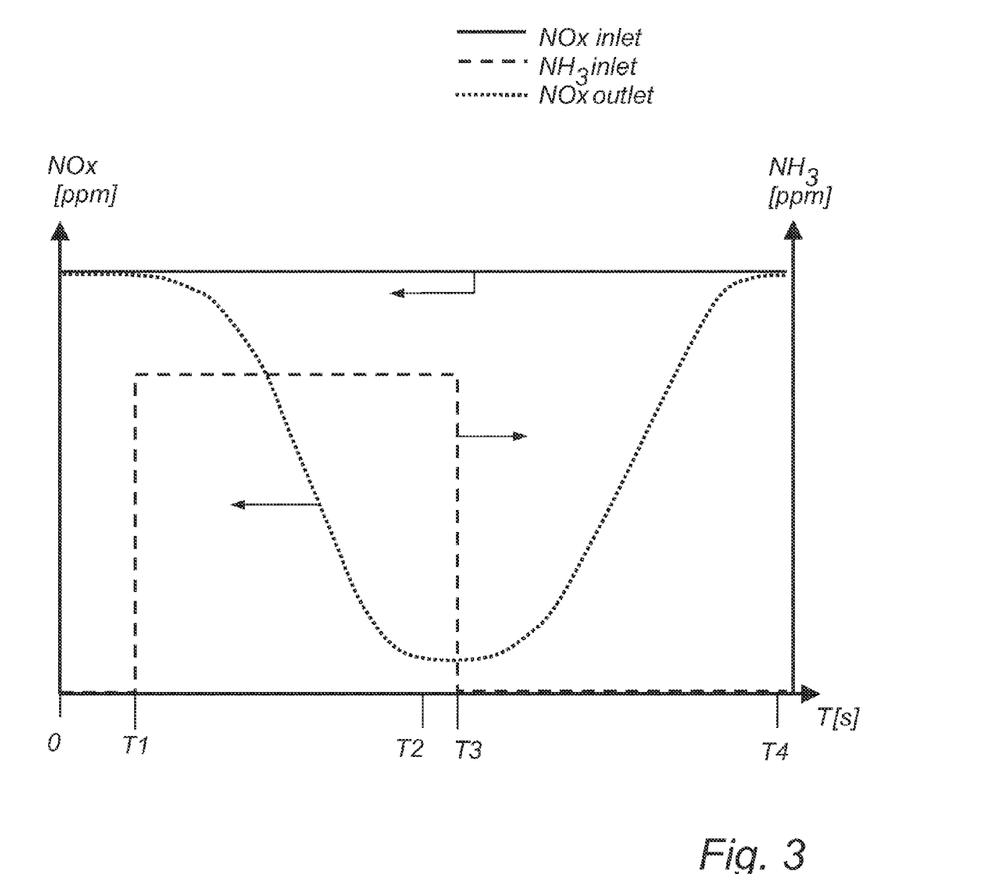
FIG. 3 is a diagram and illustrates the ammonia storage capacity of a catalyst layer.

FIG. 3 illustrates, in a schematic manner, the manner in which a typical SCR catalyst has been found to behave. A typical SCR catalyst may comprise vanadium pentoxide, $V_2O_5$, and/or wolfram trioxide, $WO_3$, as active ingredients added to a ceramic base material, such as, for instance, a honeycomb ceramic carrier.

At T=0 there is no supply of ammonia to the SCR catalyst. Thus, the concentration of NOx at the inlet of the SCR catalyst, depicted by the curve denoted "NOx inlet" in FIG. 3, is substantially equal to the concentration of NOx at the outlet of the SCR catalyst, depicted by the curve denoted "NOx outlet" in FIG. 3 at T=0. At T1 the supply of ammonia is initiated. FIG. 3 illustrates how such a supply of ammonia is initiated in the form of a step, the latter ammonia supply being depicted by the curve denoted "$NH_3$ inlet" in FIG. 3. As can be seen from FIG. 3, the outlet NOx, depicted by the curve denoted "NOx outlet", starts to decrease slowly after T1. The reason for this slow decrease is believed to be due to the fact that the SCR catalyst comprises a number of active sites. Thus, at the initiation of the supplying of ammonia to the SCR catalyst, all of these active sites are empty. Thus, during the process wherein a sufficient number of these active sites become filled with ammonia, the capacity of the SCR catalyst to decrease the concentration of NOx is gradually increased. Thereafter, at time T2 when a sufficient number of the active sites of the SCR catalyst have become filled with ammonia, the reduction of NOx can then proceed with the intended efficiency.

Continuing, at time T3 the supply of ammonia to the SCR catalyst in the form of a step ceases. As will be best understood with reference to FIG. 3, the outlet concentration of NOx, depicted by the curve denoted "NOx outlet" in FIG. 3, starts to increase after the time T3, but this increase is very slow, in particular just after the time T3. The reason for this comparatively slow increase appears to be that many active sites of the SCR catalyst are, at the time T3, filled with ammonia. Hence, even after the supplying of ammonia ceases at T3, the SCR catalyst for quite some time retains its capacity to reduce NOx. As will be readily understood with reference to FIG. 3, not until the time T4 does the concentration of NOx after the SCR catalyst, as depicted therein by the curve denoted "NOx outlet", reach the same level as the inlet concentration of NOx, the latter being depicted therein by the curve denoted "NOx inlet". The time from T1 to T2, and from T3 to T4, typically could be in the range of 30 minutes, although this time could vary considerably depending on such factors as, for example, the type of catalyst, the flue gas temperature, the amount of NOx, etc.

Hence, from a reference to FIG. 3 it will be readily apparent that the SCR catalyst has a quite large capacity to store ammonia for some time, and that the ammonia supplied at a certain moment in time is usually consumed at a later occasion.

Figure 4A:
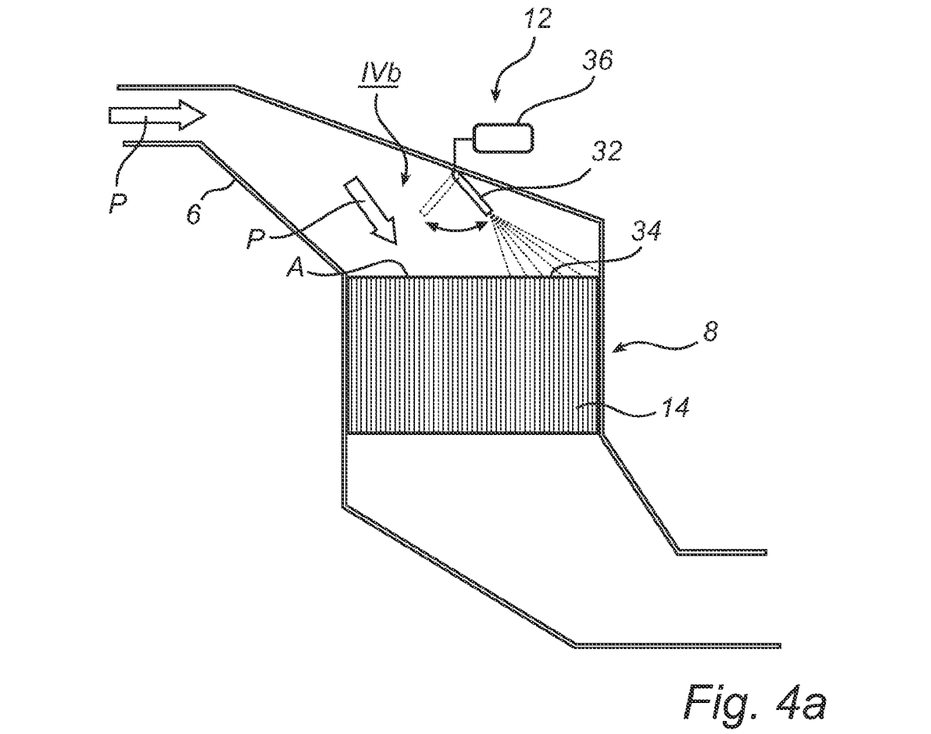
FIG. 4a is a schematic side view and illustrates an SCR reactor.
Figure 4B:
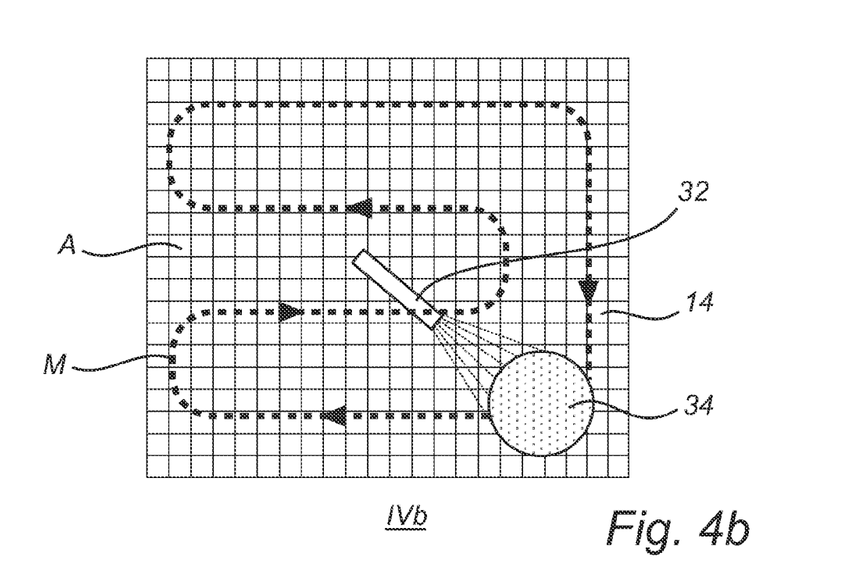

FIGS. 4a and 4b illustrate, schematically, an embodiment of the present invention, which is based on the above finding, in more detail. FIG. 4a is a cross-section and illustrates the SCR reactor 8 as seen from the side, and FIG. 4b illustrates a catalyst layer 14 as seen in the direction of the arrow IVb of FIG. 4a. The ammonia injection system 12 of the SCR reactor 8 is provided with a supply nozzle in the form of a movable tube-shaped nozzle 32 which is located above the catalyst layers 14, of which only one layer is illustrated in FIG. 4a. The movable nozzle 32 is operative for blowing a reducing agent, e.g. gaseous ammonia or vaporized urea, towards the catalyst layer 14. A flow of flue gas P enters the SCR reactor 8 via the inlet 6.

That area of the catalyst layer 14 which faces the flow of flue gas P can be called the attack area A, and is best illustrated in FIG. 4b. The attack area A is almost equal to the inner horizontal cross-sectional area of the SCR reactor 8 in the region of the catalyst layer 14. As is best illustrated in FIG. 4b, the movable nozzle 32 has a certain supply area 34, the supply area 34 being that area on the attack area A which at a certain moment in time is supplied with ammonia. Typically, the supply area 34 could amount to 1-25% of the attack area A. In the instance illustrated in FIG. 4b the supply area 34 is located in the lower right corner. The movable nozzle 32 is continuously moved over the catalyst layer 14 along a certain path, as illustrated with a dotted arrow M in FIG. 4b, such that the supply area 34 is moved over the attack area A. The path M is designed such that one cycle, i.e., the supply area 34 being moved once along the complete path M, will result in the supply area 34 covering the entire attack area A. A moving device, schematically indicated as a motor 36 in FIG. 4a, is operative for moving the movable nozzle 32, and, hence, for moving the supply area 34 over the attack area A. As alternative, the movable nozzle 32 could be moved by means of wires, compressed air cylinders, or any other means suitable for the conditions inside the SCR reactor 8.

While being moved over the catalyst layer 14 the movable nozzle 32 can be said to "paint" the catalyst layer 14 with ammonia, in a similar manner as a brush paints a floor. As can be seen from FIG. 4b, the movable nozzle 32 will, while being moved along the arrow M in one cycle, cover the entire catalyst layer 14. Due to the fact that ammonia can be stored in the catalyst layer 14, as discussed hereinbefore with reference to FIG. 3, the entire catalyst layer 14 will be active for removing NOx all the time, since those parts of the catalyst layer 14 that are not located just below the actual position of the movable nozzle 32 will contain ammonia that has been stored since the last passage of the movable nozzle 32 over that specific part of the catalyst layer 14. It will be appreciated that the size of the supply area 34 and the cycle time, i.e., the time for the movable nozzle 32 to scan over the entire attack area A of the catalyst layer 14, is designed such that the amount of ammonia supplied when the supply area 34 passes over a certain part of the catalyst layer 14 will be sufficient for efficient removal of NOx until the supply area 34 passes that same certain part the next time, i.e., in the next cycle.

The amount of ammonia supplied by means of the movable nozzle 32 in each specific instance is preferably adjusted to compensate for the uneven inlet concentration of NOx, as illustrated in FIG. 2a. Hence, for example, if the inlet concentration of NOx has a maximum at the lower part of the catalyst layer 14, as it is illustrated in FIG. 2a, then the second controller 26, illustrated in FIG. 1, may order the ammonia supply system 10 to supply an increased amount of ammonia to the movable nozzle 32 at the same instance as the movable nozzle 32 passes over the corresponding part of the catalyst layer 14. Furthermore, if the inlet concentration of NOx has a minimum at the upper part of the catalyst layer 14, as it is illustrated in FIG. 2a, then the second controller 26, illustrated in FIG. 1, may order the ammonia supply system 10 to supply a decreased amount of ammonia to the movable nozzle 32 at the same instance as the movable nozzle 32 passes over the corresponding part of the catalyst layer 14. Hence, by means of the movable nozzle 32 it becomes possible to supply ammonia in a manner which is adapted to the uneven inlet NOx profile, such that high concentrations of ammonia are supplied only in those regions where it is needed. This improves the overall reduction of NOx, without resulting in an increase in the slip of ammonia. The NOx profile could be obtained by making manual measurements, or by an automated measurement system, as will be described hereinafter.

Figure 5:
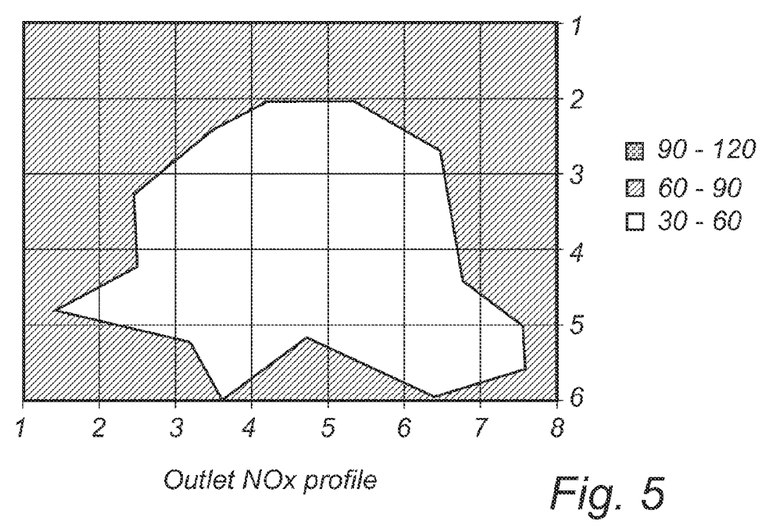
FIG. 5 is a diagram and illustrates an outlet NOx profile, as measured in various points located in a horizontal plane just downstream of a catalyst layer, when operating in accordance with a method according to the invention.

FIG. 5 illustrates an outlet NOx profile, as measured in various points located in a horizontal plane located just downstream of the catalyst layers 14, which would result from the inlet NOx profile of FIG. 2a when operating the SCR reactor 8 in accordance with the method described hereinbefore with reference to FIGS. 4a and 4b. As can be seen from FIG. 5, the outlet NOx profile is rather even with concentrations varying from 30 mg of NOx per $Nm^3$ gas, wet basis, at the areas with the lowest concentration of NOx, up to about 75 mg of NOx per $Nm^3$ gas, wet basis, at the areas with the highest concentration of NOx. Typically, the average outlet concentration of NOx would be in the range of 50 mg of NOx per $Nm^3$ gas, wet basis. The slip of ammonia would be similar as in the prior art method illustrated in FIG. 2b. Hence, the present invention makes it possible to substantially reduce the outlet NOx concentration without increasing the slip of ammonia from the SCR reactor 8.

Figure 6:
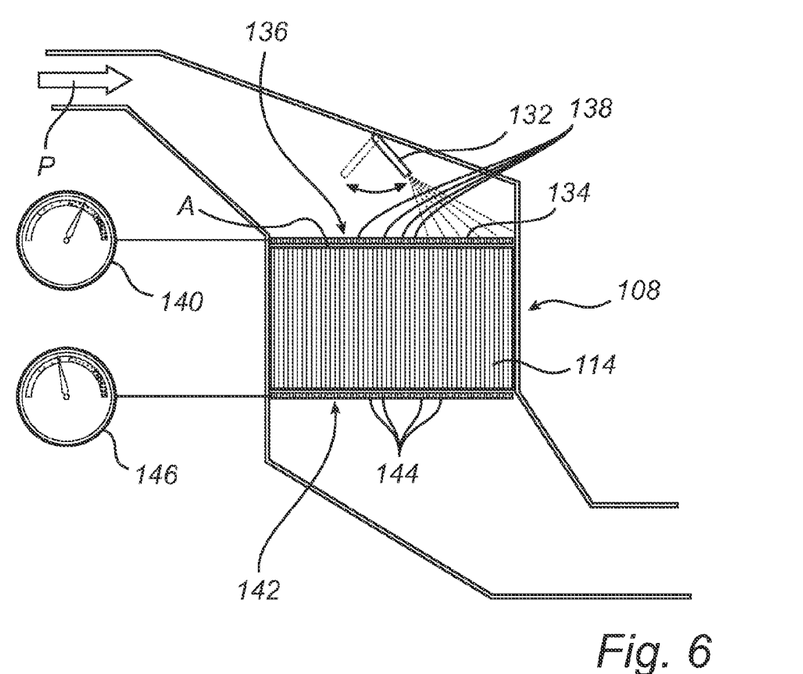
FIG. 6 illustrates an SCR reactor in accordance with an alternative embodiment of the present invention.

FIG. 6 illustrates an alternative embodiment of the present invention. An SCR reactor 108 is provided with one or several layers of catalyst, of which only one catalyst layer 114 is illustrated in FIG. 6. A movable nozzle 132 is operative for being moved above the catalyst layer 114 and for supplying ammonia in a similar manner as has been described hereinbefore with reference to FIGS. 4a and 4b. The SCR reactor 108 is provided with a first measurement grid 136 which makes it possible to measure the inlet concentration of NOx in various points upstream of the catalyst layer 114. The first measurement grid 136 comprises a number of sampling points 138 distributed above the catalyst layer 114, and a NOx analyser 140 that measures the concentration of NOx in gas obtained from said sampling points 138. It will be appreciated that various types of NOx analysers, including IR analysers, laser instruments, NOx sensors, etc., that are per se known, can be utilized for measuring the NOx concentration. The first measurement grid 136 may be operative for online measurement of the inlet NOx concentration, or for measuring the inlet NOx concentration on certain occasions, such as once every 30 minutes, or whenever the operation of the boiler 2, illustrated in FIG. 1, changes. The result of the measurements of the NOx analyzer 140 may have a form similar to the profile illustrated in FIG. 2a, and is forwarded to the first controller 24, illustrated in FIG. 1. The first controller 24 may then adjust the amount of ammonia supplied by the movable nozzle 132 in each specific instance in relation to the most recent inlet NOx profile as measured by means of the first measurement grid 136.

Furthermore, the SCR reactor 108 is provided with a second measurement grid 142 which makes it possible to measure the outlet concentration of NOx and/or ammonia in various points downstream of the catalyst layer 114. The second measurement grid 142 comprises a number of sampling points 144 distributed downstream of the catalyst layer 114, and a NOx analyser 146 that measures the concentration of NOx in gas obtained from said sampling points 144. As an extra option, or as alternative to the NOx analyser, an ammonia analyser may be provided for measuring the concentration of ammonia, i.e., an ammonia slip profile, in various points downstream of the catalyst layer 114. The second measurement grid 142 may be operative for online measurement of the outlet NOx concentration, or for measuring the outlet NOx concentration on certain occasions, such as once every 30 minutes, or whenever the operation of the boiler 2, illustrated in FIG. 1, changes. The result of the measurements of the NOx analyzer 146 may have a form similar to the profile illustrated in FIG. 5, and is forwarded to the first controller 24, illustrated in FIG. 1. The first controller 24 may then adjust the amount of ammonia supplied by means of the movable nozzle 132 in each specific instance in relation to the most recent outlet NOx profile as measured by means of the second measurement grid 142. Optionally, measurements of the concentration of ammonia downstream of the catalyst layer 114, such measurements being made by means of the second measurement grid 142, may also be forwarded to the first controller 24.

It will be appreciated that the first controller 24 may be operative for receiving signals from only one of the first measurement grid 136 and the second measurement grid 142, or from both measurement grids.

Figure 7:
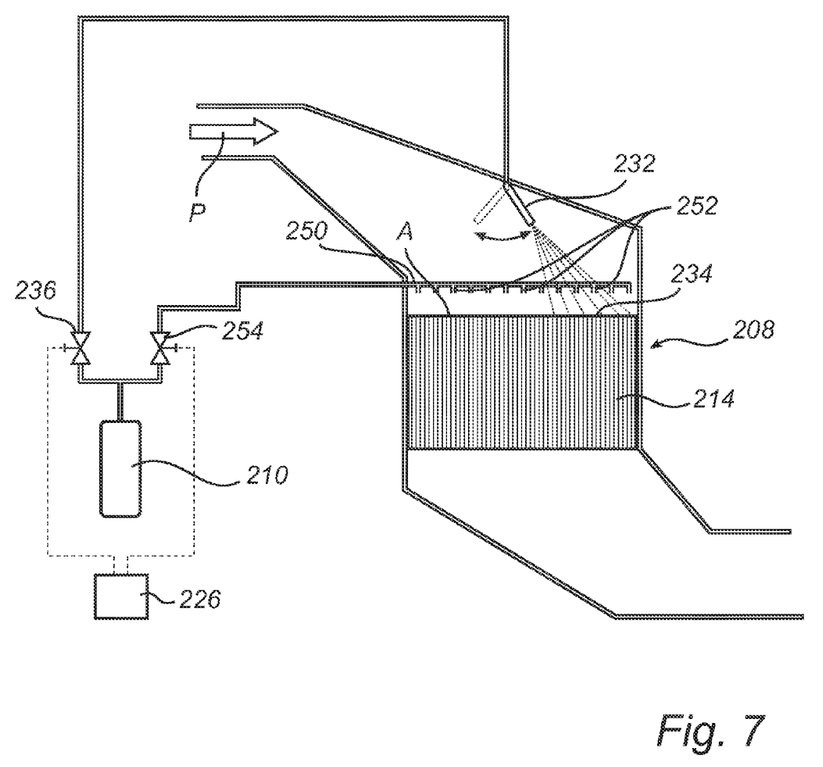
FIG. 7 illustrates an SCR reactor in accordance with a further alternative embodiment of the present invention.

FIG. 7 illustrates an alternative embodiment of the present invention. An SCR reactor 208 is provided with one or several layers of catalyst, of which only one catalyst layer 214 is illustrated in FIG. 7. A movable nozzle 232 is operative for being moved above the catalyst layer 214 and for supplying ammonia in a supply area 234 in a similar manner as has been described hereinbefore regarding the movable nozzle 32 with reference to FIGS. 4a to 4b. The SCR reactor 208 is provided with a fixed ammonia supply grid 250. The fixed ammonia supply grid 250 is provided with a number of ammonia supply points 252. Such fixed ammonia supply grids are per se known from SCR applications. Both the ammonia supply grid 250 and the movable nozzle 232 are connected to an ammonia supply system 210, which is similar to the system 10 illustrated hereinbefore with reference to FIG. 1. The ammonia supply system 210 is operative for supplying gaseous ammonia to the movable nozzle 232 and to the fixed ammonia supply grid 250.

The supply of ammonia is controlled by means of a second controller 226, which is similar to the controller 26 illustrated in FIG. 1. However, the second controller 226 controls a first valve 236, which controls the supply of ammonia to the movable nozzle 232, separately from a second valve 254, which controls the supply of ammonia to the fixed ammonia supply grid 250. For instance, the controller 226 may control the second valve 254 to supply 60-95% of the total amount of ammonia needed for the SCR reactor 208, in accordance with the measurements of inlet NOx concentration etc, as disclosed in FIG. 1, to the fixed ammonia supply grid 250. The rest of the ammonia needed, i.e., 5-40% of the total ammonia needed, may be supplied to the movable nozzle 232. In this respect the second controller 226 controls the first valve 236 in view of the inlet NOx profile, as illustrated in FIG. 2a and/or as measured in accordance with FIG. 6, such that more ammonia is supplied to the movable nozzle 232 on those occasions when the supply area 234 passes over parts of the catalyst layer 214 where the inlet NOx concentration is high. Hence, in the embodiment described with reference to FIG. 7 the fixed ammonia supply grid 250 is operative for supplying a rather constant amount of ammonia corresponding to a base load of ammonia required over the entire attack area A of the catalyst layer 214, while the movable nozzle 232 is operative for supplying a rather small amount of ammonia, which is varied as the movable nozzle 232, and, hence, the supply area 234, scans over the attack area A of the catalyst layer 214 to account for the uneven inlet NOx profile.

According to an alternative embodiment a single common valve, controlling the flow of ammonia from the ammonia supply system 210, is utilized for controlling merely the total flow of ammonia forwarded to the fixed ammonia supply grid 250 and the movable nozzle 232, the split between the ammonia forwarded to the fixed ammonia supply grid 250 and to the movable nozzle 232 being fixed, by means of, e.g., fixed throttlings, at, e.g., 80% of the total amount of ammonia being supplied to the fixed ammonia supply grid 250, and 20% of the total amount of ammonia being supplied to the movable nozzle 232. The varying need for ammonia over the attack area A, due to the uneven NOx profile, is handled by varying the speed of moving the movable nozzle 232 over the attack area A, such that the supply area 234 moves more slowly over those areas of the attack area A where the NOx concentration is high, and where more ammonia is needed.

An advantage of the embodiment of FIG. 7 is that the need for storing reducing agent in the catalyst layer, in accordance with the principles described hereinbefore with reference to FIGS. 3, 4a and 4b, is decreased, since the fixed ammonia supply grid 250 supplies the base level of the ammonia to the catalyst layer 214 all over the attack area A all the time. Hence, the need for storing ammonia in the catalyst material only concerns the comparably small amount of ammonia supplied by means of the movable nozzle 232. The reduced need for storing ammonia may reduce the total volume of catalyst material needed.

The embodiment illustrated in FIG. 7 may be utilized when building new SCR reactors. The embodiment of FIG. 7 can also be utilized when upgrading existing SCR reactors, that already have a fixed ammonia supply grid, to increase the NOx removal efficiency.

It will be appreciated that numerous variants of the above described embodiments of the present invention are possible within the scope of the appended claims.

Hereinbefore the supply nozzle has been indicated as a movable tube-shaped nozzle 32, 132, 232. It will be appreciated that other supply nozzle designs are possible. In accordance with a further embodiment it is possible to utilize as the supply nozzle a fixed tube, and to utilize movable guide plates, or pressurized air streams, to control the direction of the ammonia flow, and, hence, to move the supply area. Still further, varying the pressure of the ammonia supplied to a supply nozzle can be utilized as a means for moving the supply area. Hence, such a supply nozzle would have very few movable parts, or even none in the event of air streams controlling the direction of the ammonia flow, but would still allow the flow of ammonia, or, rather, the supply area 34 illustrated in FIG. 4b, to be moved over the attack area A of the catalyst layer 14.

Hereinbefore it has been described that one supply nozzle, which may be a movable nozzle 32, 132, 232, has been arranged in each SCR reactor 8, 108, 208. It will be appreciated that it will be possible to arrange several supply nozzles, such as 2 to 9 supply nozzles, in one and the same SCR reactor, in order to decrease the cycle time. When several supply nozzles are utilized for supplying reducing agent, the supply area of each of those supply nozzles should correspond to 1-25% of the attack area A, and the total area of all supply areas should be less than about 75% of the attack area A. Furthermore, it is possible to arrange one or several supply nozzles above the first catalyst layer, but also, as an option, to arrange, additionally, one or several supply nozzles between consecutive catalyst layers of the SCR reactor.

Furthermore, the supply nozzle need not necessarily be placed inside the actual SCR reactor. Hence, a supply nozzle can be placed also upstream of the SCR reactor, for example in the SCR reactor inlet 6, illustrated in FIG. 1 and FIG. 4a, in the duct 4, illustrated in FIG. 1, forwarding process gas from the boiler 2 to the SCR reactor 8, or even inside the boiler 2.

It has been described hereinbefore that the amount of reducing agent supplied to the supply area 34, 134, 234 by means of the movable nozzle 32, 132, 232 can be varied by means of varying the amount, i.e., the flow in, e.g., kg/h, of reducing agent being supplied to said movable nozzle 32, 132, 232 by means of the ammonia supply system 10, 210. It will be appreciated that other methods of varying the amount of reducing agent being supplied to the supply area are also possible. For instance, it is possible to vary the speed of moving the supply area over the attack area. Hence, the supply area could be moved quickly over those portions of the attack area where the NOx concentration is low, and could be moved more slowly over those portions of the attack area where the NOx concentration is high, to supply more of the reducing agent to those portions. A further alternative for varying the amount of reducing agent being supplied to the supply area is to vary the size of the supply area, as the supply area is moved over the attack area. It is also possible to combine these various methods of varying the amount of reducing agent being supplied to the supply area.

Hereinbefore it has been described that ammonia is utilized as a reducing agent which reduces the NOx. It will be appreciated that other types of reducing agents area also possible, including urea, aqueous solutions of ammonia etc.

It has been described hereinbefore, with reference to FIG. 1, that the present invention can be utilized for cleaning a process gas generated in a coal fired boiler. It will be appreciated that the invention is useful also for other types of process gases, including process gases generated in oil fired boilers, incineration plants, including waste incineration plants, cement kilns, blast furnaces and other metallurgical plants including sinter belts, etc.

The invention claimed is:

1. A method of controlling a supply of an amount of reducing agent to a selective catalytic reduction reactor (8) comprising at least one catalyst layer (14) operative for removing NOx from a flow (P) of process gas of a process plant (1), characterised by
supplying at least one supply area (34) corresponding to a part of an attack area (A) of said at least one catalyst layer (14), at least a portion of said amount of reducing agent, and
moving said supply area (34) over the attack area (A).

2. A method according to claim 1, wherein the amount of reducing agent supplied to said supply area (34) is varied, as the supply area (34) is moved over the attack area (A), based on a NOx profile indicating the concentrations of NOx at various points on the attack area (A).

3. A method according to claim 1, wherein the amount of reducing agent supplied to said supply area (34) is varied based on a NOx profile updated on a regular basis using NOx measurements performed upstream and/or downstream of the catalyst layer (14).

4. A method according to claim 1, wherein the amount of reducing agent supplied to said supply area (34) is varied, as the supply area (34) is moved over the attack area (A), based on a reducing agent slip profile indicating the concentrations of the reducing agent at various points downstream of the catalyst layer (14).

5. A method according to claim 1, wherein a first portion of the amount of reducing agent is supplied via a fixed reducing agent supply device (250), and a second portion of the amount of reducing agent is supplied in said at least one supply area (234) being moved over said attack area (A).

6. A method according to claim 1, wherein said amount of reducing agent is supplied as a first portion corresponding to 60-95%, and a second portion corresponding to 5-40% of a total amount of the reducing agent being supplied to said at least one catalyst layer (14).

7. A method according to claim 1, wherein said supply area (34) corresponds to 1-25% of said attack area (A).

8. A method according to claim 1, wherein said supply area (34) is moved over the attack area (A) such that the supply area (34) is scanned over substantially the entire attack area (A) in one cycle of moving said supply area (34).

9. A device for controlling a supply of a reducing agent to a selective catalytic reduction reactor (8) comprising at least one catalyst layer (14) operative for removing NOx from a flow (P) of process gas of a process plant (1), characterised by
   at least one supply nozzle (32) operative for supplying reducing agent in at least one supply area (34) corresponding to a part of an attack area (A) of said at least one catalyst layer (14), and
   a moving device (36) operative for moving said supply area (34) over the attack area (A).

10. A device according to claim 9, further comprising a fixed reducing agent supply grid (250) operative for supplying a first portion of the reducing agent to said at least one catalyst layer (214) in a number of points (252) distributed over the attack area (A), and said at least one supply nozzle (232) operative for supplying in said supply area (234) a second portion of the reducing agent to said at least one catalyst layer (214).

11. A device according to claim 9, further comprising a control device (24, 26; 226) operative for controlling the amount of reducing agent supplied by said at least one supply nozzle (32; 232) and for varying the amount of reducing agent supplied to said supply area (34; 234), as the supply area (34; 234) is moved over the attack area (A), based on a NOx profile indicating the concentrations of NOx at various points on the attack area (A).

12. A device according to claim 9, further comprising at least one NOx measurement grid (136, 142) operative for measuring a NOx concentration profile of said flow (P) of process gas, a control device (24, 26) operative for receiving data from said NOx measurement grid (136, 142) and for controlling the amount of reducing agent supplied by means of said at least one supply nozzle (132), based on said NOx concentration profile, as said supply area (134) is moved over said attack area (A).

* * * * *